US012549508B2

(12) United States Patent
Kaur et al.

(10) Patent No.: US 12,549,508 B2
(45) Date of Patent: Feb. 10, 2026

(54) INCREASE CAPACITY OF A WIRELESS TELECOMMUNICATION NETWORK

(71) Applicant: T-Mobile USA, Inc., Bellevue, WA (US)

(72) Inventors: Taylor Lynn Kaur, Bellevue, WA (US); Aziz Yunus Motiwala, Bothell, WA (US); Rahul Pal, Bothell, WA (US); Sandesh Shetty, Sammamish, WA (US); Samir Ramesh Shura, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 421 days.

(21) Appl. No.: 18/167,683

(22) Filed: Feb. 10, 2023

(65) Prior Publication Data

US 2024/0275760 A1 Aug. 15, 2024

(51) Int. Cl.
*H04L 61/3015* (2022.01)
*H04W 72/12* (2023.01)
*H04W 88/16* (2009.01)

(52) U.S. Cl.
CPC ......... *H04L 61/3025* (2013.01); *H04W 72/12* (2013.01); *H04W 88/16* (2013.01)

(58) Field of Classification Search
CPC .... H04L 61/3025; H04W 72/12; H04W 88/16
See application file for complete search history.

(56) References Cited

U.S. PATENT DOCUMENTS

| 7,088,705 | B2 | 8/2006 | Curry et al. |
| 7,391,748 | B2 | 6/2008 | Feather |
| 7,660,584 | B2 | 2/2010 | Mizell et al. |
| 7,853,720 | B2 | 12/2010 | Choi et al. |
| 7,860,073 | B2 | 12/2010 | Chen |
| 8,179,888 | B2 | 5/2012 | Chen et al. |
| 8,200,830 | B2 * | 6/2012 | Ramankutty ......... H04W 24/08 709/227 |
| 8,243,686 | B2 | 8/2012 | Bhalla et al. |
| 8,255,681 | B2 | 8/2012 | Molen et al. |
| 8,374,165 | B2 | 2/2013 | Yang |

(Continued)

FOREIGN PATENT DOCUMENTS

| CN | 102907073 B | 4/2015 |
| CN | 105392020 B | 1/2019 |

(Continued)

*Primary Examiner* — Duc C Ho
(74) *Attorney, Agent, or Firm* — Perkins Coie LLP

(57) ABSTRACT

The disclosed system includes a first gateway of a first type configured to receive wireless packets from a core network node, and a second gateway of a second type colocated with the first gateway and configured to transmit at least a portion of the wireless packets to a network. The first gateway is configured with a first internet address that identifies the second gateway and a second internet address that identifies a third gateway of the second type. The first gateway is configured to transmit a first portion of the wireless packets to the second gateway based on the first internet address and transmit a second portion of the wireless packets to the third gateway based on the second internet address. The second gateway is configured with a third internet address that identifies the second gateway.

20 Claims, 7 Drawing Sheets

(56) References Cited

U.S. PATENT DOCUMENTS

| | | |
|---|---|---|
| 8,406,170 B2 | 3/2013 | Rune |
| 8,467,386 B2 | 6/2013 | Sarikaya et al. |
| 8,559,448 B2 | 10/2013 | Welin et al. |
| 8,634,346 B2 | 1/2014 | Velandy et al. |
| 8,811,317 B2 | 8/2014 | Liang et al. |
| 8,832,433 B2 | 9/2014 | Gupta |
| 8,848,516 B2 | 9/2014 | Sahin et al. |
| 8,879,486 B2 | 11/2014 | Nylander et al. |
| 9,131,473 B2 | 9/2015 | Wang et al. |
| 9,391,951 B2 | 7/2016 | Van Bemmel |
| 9,480,092 B2 | 10/2016 | Horn et al. |
| 9,503,970 B2 | 11/2016 | Horn et al. |
| 9,538,560 B1 | 1/2017 | Velandy et al. |
| 9,717,019 B2 | 7/2017 | Duan et al. |
| 9,723,023 B2 | 8/2017 | Ellard et al. |
| 9,788,201 B2 | 10/2017 | Stojanovski et al. |
| 9,794,771 B2 | 10/2017 | Raveendran |
| 9,848,399 B2 | 12/2017 | Roeland |
| 9,867,098 B2 | 1/2018 | Kwok et al. |
| 9,992,705 B2 | 6/2018 | Sankar et al. |
| 10,003,565 B2 | 6/2018 | George |
| 10,057,927 B2 | 8/2018 | Kiss et al. |
| 10,135,678 B2 | 11/2018 | Chakrabarti et al. |
| 10,172,037 B2 | 1/2019 | Singh et al. |
| 10,237,795 B2 | 3/2019 | Zhao et al. |
| 10,243,839 B2 | 3/2019 | Edge et al. |
| 10,341,947 B2 | 7/2019 | Mathai et al. |
| 10,362,473 B2 | 7/2019 | Gupta |
| 10,383,016 B2 | 8/2019 | Kiss et al. |
| 10,425,887 B2 | 9/2019 | Buckley et al. |
| 10,447,593 B2 | 10/2019 | Gao et al. |
| 10,587,503 B2 | 3/2020 | Yu |
| 10,595,187 B2 | 3/2020 | Tandon et al. |
| 10,674,346 B2 | 6/2020 | Faccin et al. |
| 10,694,445 B2 | 6/2020 | Albasheir et al. |
| 10,721,664 B2 | 7/2020 | Nilsson et al. |
| 10,742,595 B2 | 8/2020 | Kottikal et al. |
| 10,749,837 B2 | 8/2020 | Mendoza et al. |
| 10,863,410 B1 | 12/2020 | Wells et al. |
| 10,979,482 B2 | 4/2021 | Trossen |
| 10,992,635 B2 | 4/2021 | Kapoor et al. |
| 11,153,920 B2 | 10/2021 | Yoshikawa et al. |
| 11,323,410 B2 | 5/2022 | Kant |
| 11,432,348 B2 | 8/2022 | Albasheir et al. |
| 11,470,468 B2 | 10/2022 | Chang et al. |
| 11,490,350 B2 | 11/2022 | Zhang et al. |
| 11,490,430 B2 | 11/2022 | Shah |
| 2002/0024943 A1 | 2/2002 | Karaul et al. |
| 2005/0066041 A1 | 3/2005 | Chin et al. |
| 2005/0226258 A1 | 10/2005 | Chischportich et al. |
| 2007/0091862 A1 | 4/2007 | Ioannidis |
| 2012/0120932 A1 | 5/2012 | Liang et al. |
| 2013/0058312 A1 | 3/2013 | Zhou et al. |
| 2014/0050208 A1 | 2/2014 | Annaluru et al. |
| 2015/0117408 A1* | 4/2015 | Kedalagudde ......... H04L 45/64 370/328 |
| 2016/0316402 A1 | 10/2016 | Shi et al. |
| 2017/0195288 A1 | 7/2017 | Libby et al. |
| 2019/0191343 A1 | 6/2019 | Iwai et al. |
| 2020/0404742 A1 | 12/2020 | Hashmani et al. |
| 2021/0400768 A1 | 12/2021 | Chauhan et al. |
| 2022/0264434 A1 | 8/2022 | Landais et al. |
| 2024/0275760 A1* | 8/2024 | Kaur .................... H04W 72/12 |

FOREIGN PATENT DOCUMENTS

| | | |
|---|---|---|
| CN | 111405639 B | 5/2022 |
| EP | 1143748 A2 | 10/2001 |
| EP | 1243100 A1 | 9/2002 |
| EP | 2566199 B1 | 5/2015 |
| EP | 2168345 B1 | 4/2016 |
| EP | 3132623 A1 | 2/2017 |
| EP | 3136818 A1 | 3/2017 |
| EP | 2974215 B1 | 10/2017 |
| EP | 3236694 A1 | 10/2017 |
| EP | 3769477 A1 | 1/2021 |
| EP | 3550795 B1 | 6/2021 |
| EP | 3566422 B1 | 9/2022 |
| JP | 2015533465 A | 11/2015 |
| KR | 100388064 B1 | 6/2003 |
| KR | 100617780 B1 | 8/2006 |
| KR | 20070024387 A | 3/2007 |
| KR | 101029259 B1 | 4/2011 |
| KR | 101896551 B1 | 9/2018 |
| KR | 102209748 B1 | 2/2021 |
| WO | 2008148357 A1 | 12/2008 |
| WO | 2010015188 A1 | 2/2010 |
| WO | 2010127511 A1 | 11/2010 |
| WO | 2010130128 A1 | 11/2010 |
| WO | 2011054145 A1 | 5/2011 |
| WO | 2011085373 A2 | 7/2011 |
| WO | 2012113153 A1 | 8/2012 |
| WO | 2012142889 A1 | 10/2012 |
| WO | 2013104344 A1 | 7/2013 |
| WO | 2015024388 A1 | 2/2015 |
| WO | 2015085521 A1 | 6/2015 |
| WO | 2016155011 A1 | 10/2016 |
| WO | 2016160203 A1 | 10/2016 |
| WO | 2017078702 A1 | 5/2017 |
| WO | 2017113987 A1 | 7/2017 |
| WO | 2017117044 A1 | 7/2017 |
| WO | 2018223645 A1 | 12/2018 |
| WO | 2019144826 A1 | 8/2019 |
| WO | 2021047443 A1 | 3/2021 |
| WO | 2022002419 A1 | 1/2022 |
| WO | 2022005603 A1 | 1/2022 |

* cited by examiner

INCREASE CAPACITY OF A WIRELESS TELECOMMUNICATION NETWORK

BACKGROUND

A telecommunications network is a group of nodes interconnected by telecommunications links that are used to exchange messages between the nodes. The links may use a variety of technologies based on the methodologies of circuit switching, message switching, or packet switching, to pass messages and signals.

Multiple nodes may cooperate to pass the message from an originating node to the destination node, via multiple network hops. For this routing function, each node in the network is assigned a network address for identifying and locating it on the network. The collection of addresses in the network is called the address space of the network.

A fully qualified domain name (FQDN) is a complete domain name that specifies an entity's exact network location. An FQDN is conventionally written as a list of domain labels separated by a period, where the top of the hierarchy in an FQDN begins with the rightmost label. For instance, for an FQDN "somehost.example.com," "com" is a label directly under the root zone, "example" is nested under "com," and finally "somehost" is nested under "example.com."

BRIEF DESCRIPTION OF THE DRAWINGS

Detailed descriptions of implementations of the present invention will be described and explained through the use of the accompanying drawings.

Figure 1:
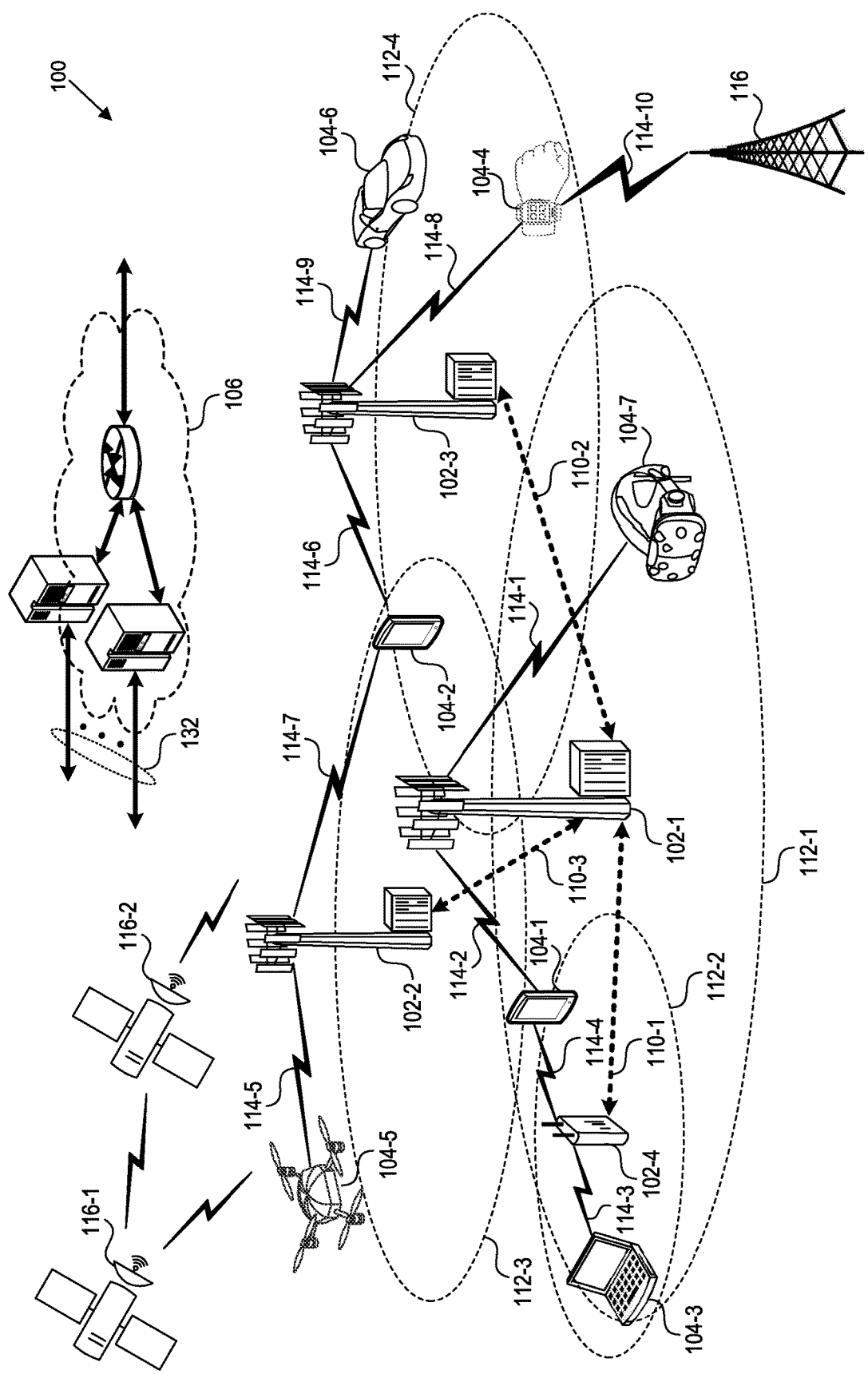
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to increase capacity of a wireless telecommunication network. The system includes a voice cluster in a data cluster. The voice cluster includes a serving gateway (SGW) A configured to receive voice packets A and data packets A from a core network function, and a packet data network gateway (PGW) A colocated with the SGW A. The PGW A is configured to receive the voice packets A from the PGW A and transmit the voice packets A to a network. The data cluster includes an SGW B configured to receive voice packets B and data packets B from the core network function, and a PGW B colocated with the SGW B. The PGW B is configured to receive the data packets B from the SGW B and transmit the data packets B to the network.

The PGW A is further configured to receive the voice packets B from the SGW B and transmit the voice packets B to the network. The PGW B is further configured to receive the data packets A from the SGW A and transmit the data packets A to the network.

To enable the SGW's A, B to communicate with PGWs A, B, each SGW has two FQDN addresses: address A, and address B. In other words, each SGW has an address alias. A portion of each of the two addresses identifies one PGW A, B. Specifically, the address A includes a first portion that identifies the SGW A and a second portion that identifies the PGW A. The address B includes a first portion that identifies the SGW A and a second portion that identifies the PGW B.

The description and associated drawings are illustrative examples and are not to be construed as limiting. This disclosure provides certain details for a thorough understanding and enables a description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
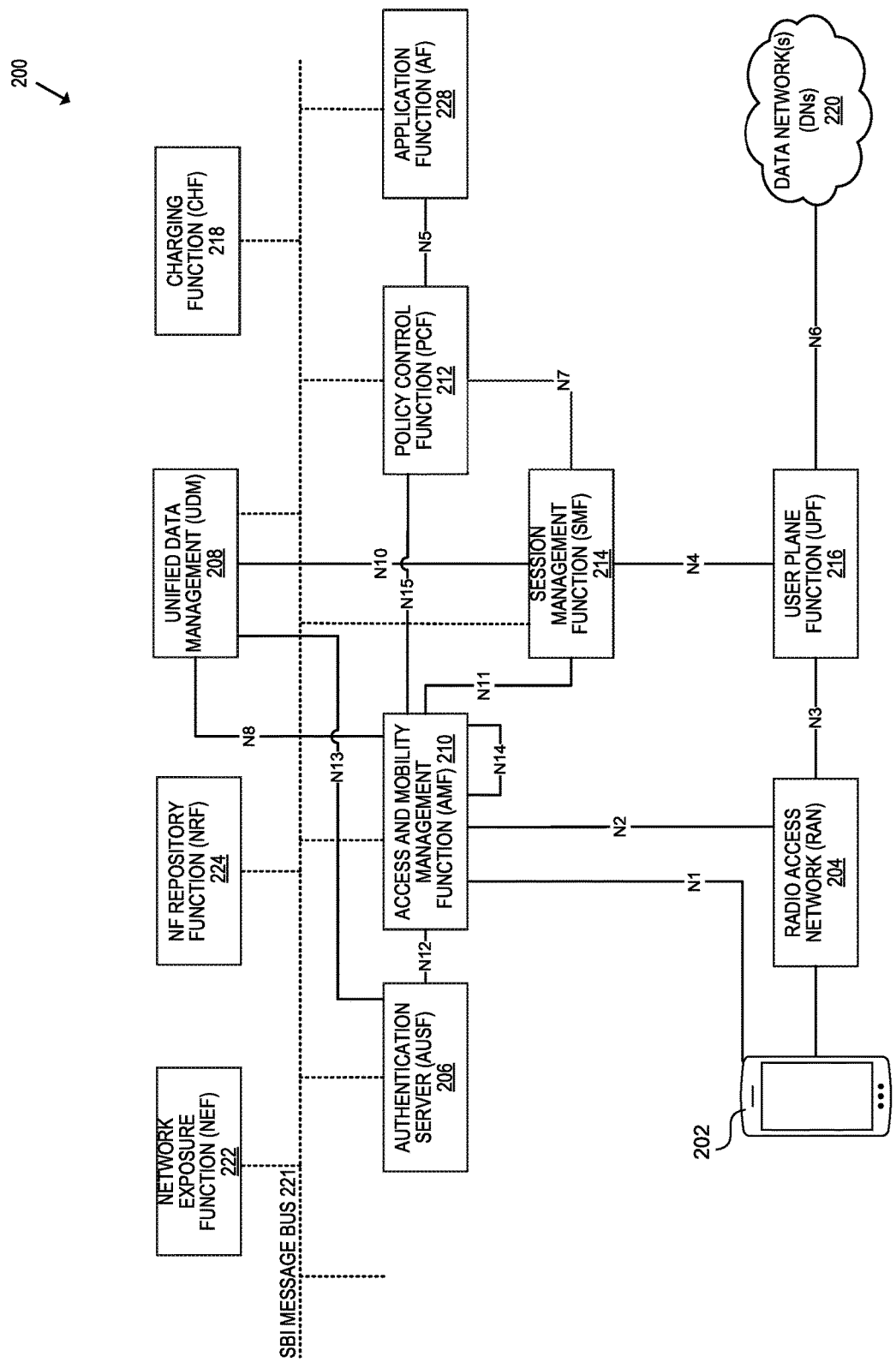
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a session management function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes network slice selection, which is regulated by the NSSF 226.

Increase Capacity of a Wireless Telecommunication Network

Figure 3:
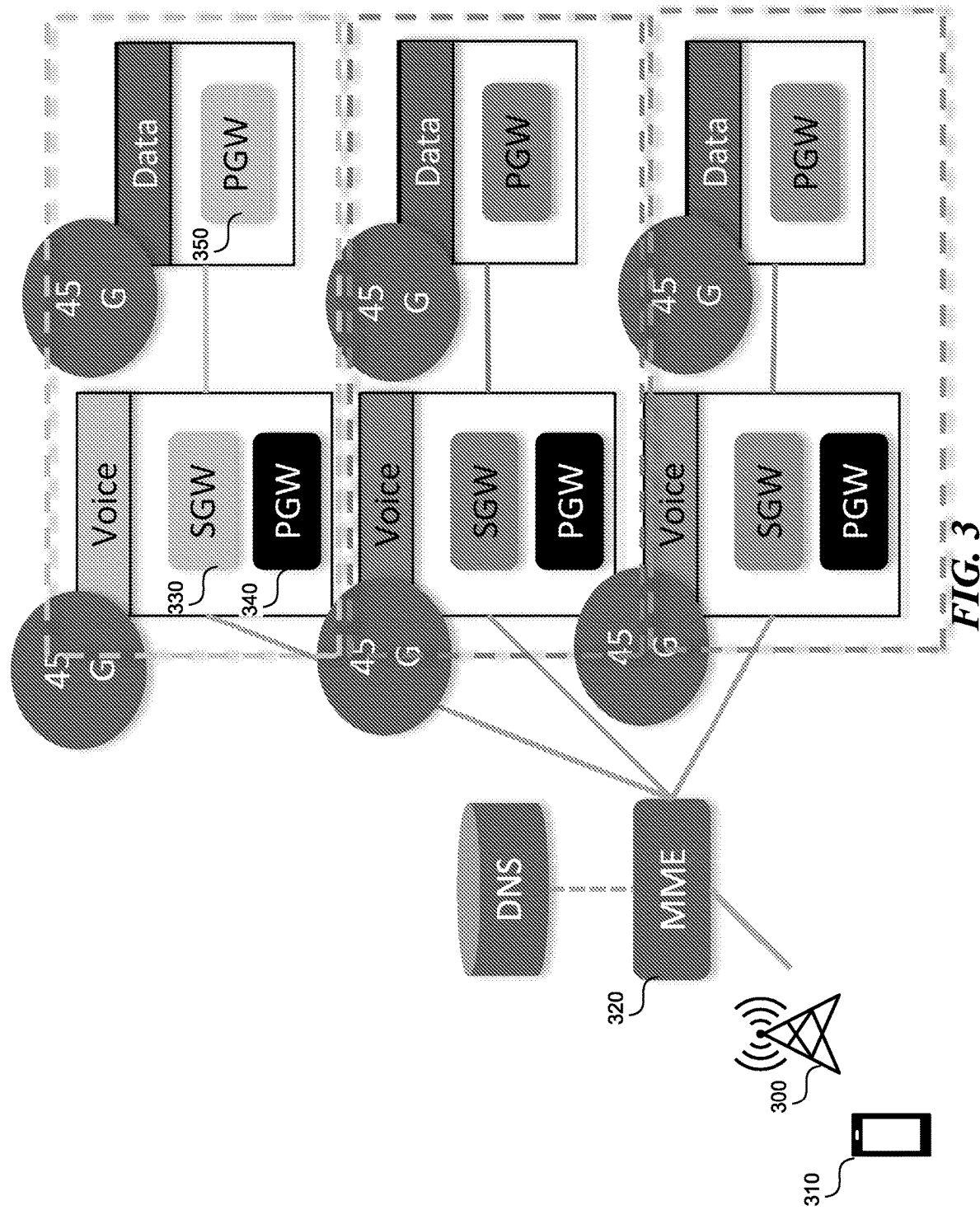
FIG. 3 shows how a base station in a network sequentially processes voice and data packets.

FIG. 3 shows how a base station in network 100 in FIG. 1 sequentially processes voice and data packets. The base station 300 can receive and send voice and data packets while communicating with the UE 310. The base station 300 can communicate with Mobile Management Entity (MME) 320, which transmits the signaling that enables low-level connection management.

The MME 320 forwards the incoming packets received from the UE 310 to a serving gateway (SGW) 330, which in turn forwards the incoming packets to PGW 340, 350. The PGW 340 can be a packet data network (PDN) gateway type and can act as an interface between the network 100 and other packet data networks, such as the internet or SIP-based IP Multimedia Subsystem (IMS) networks. The MME 320 can select the SGW 330 to communicate with the UE 310. The SGW 330 can serve data, voice, video, and short message service (SMS) packets. The SGW 330 analyzes the incoming packets, handles the voice packets, and forwards data packets to the PGW 350 dedicated to handling data packets. Once the SGW 330 is chosen for a particular UE 310, the gateway selection remains static.

To reduce latency, the SGW 330 and the PGW 340 need to be colocated together. The SGW 330 and the PGW 340, however, can have limited capacity, such as 45 Gigabytes (GB). In areas with high traffic, this limited capacity may not be enough to meet the needs of the network 100.

Figure 4:
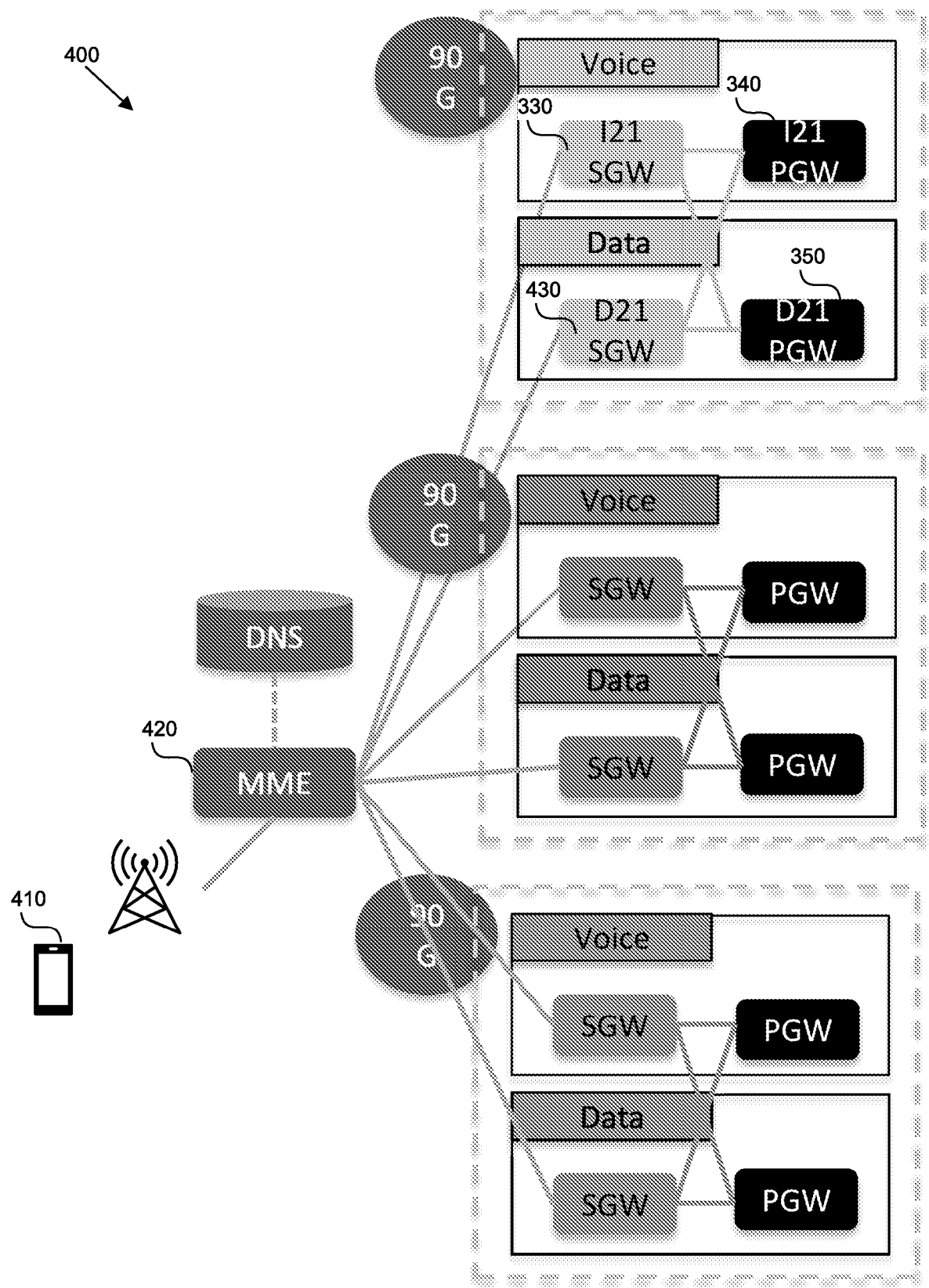
FIG. 4 shows creation of a second SGW to double the network capacity.

FIG. 4 shows creation of a second SGW to double the network capacity. The disclosed system 400 adds a second SGW 430, in addition to the existing SGW 330, effectively doubling the capacity of the network. If the capacity of the network, as described in FIG. 3, is 45 GB, the capacity of the network as described in FIG. 4 is 90 GB. The system 400 can send the voice and data to the SGW 330, 430 in a round-robin scheduling fashion. To enable the system 400 to add an additional SGW 430, the system needs to carefully manage the IP addresses ("addresses") of the SGWs 330, 430 and PGWs 340, 350.

Each gateway 330, 340, 350, 430 is known by a canonical name, e.g., canonical address. The canonical address is constructed using the following format:
<topology_status>.<interface>.<node_name>.<site_code>.<region_code>.

Every wireless telecommunication network supports the canonical format because multiple wireless telecommunication networks need to interoperate to support roaming UEs 410. For example, when a UE 410 is roaming, the PGW can be from network 100 while the SGW is from a different network.

In a non-roaming scenario, the SGW 330 address is:
topon.s11.dnsmfi21.aro.c1.node.epc.mnc260.cc310.3gppnetwork.org.

The first two elements, <topology_status> and <interface>, are renamed by the MME 420. The first element indicates the topology status. The value of "topon" indicates that the SGW 330 and PGW 340 need to be as colocated, e.g., as physically close to each other, as possible. The value S11 indicates a type of interface that the PGW 340, 350 and the SGW 330, 430 use. The SGW 330, 430 generally uses an S11 interface, while the PGW 340, 350 uses the S5 interface.

The PGW 340, 350 address is:
topon.s5pgwdnsmfd21.dnsmfi21.aro.c1.node.epc.mnc260.mcc310.3gppnetwork.org.

As can be seen in the above two addresses, besides the first two elements, the rest of the address, namely "dnsmfi21.aro.c1.node.epc.mnc260.mcc310.3gppnetwork.org," is identical between the SGW 330, 430 and the PGW 340, 350, which indicates that the two gateways are physically collocated. The identical suffixes of the IP addresses guide the MME 420 into believing that it is selecting the exact same nodes, because it doesn't consider the top two labels. By giving matching suffixes to addresses of the SGW 330, 430 and the PGW 340, 350, the MME 420 is guided into selecting the SGWs and the PGWs that are colocated with each other.

To double the capacity of the SGW and the PGW, the MME 420 can select multiple SGWs, in particular, one SGW 330 for voice packets and one SGW 430 for data packets. Each of the SGWs 330, 430 can receive both voice and data packets.

The network allows only one fully qualified domain name (FQDN) per PGW 340, 350. FQDN, sometimes also referred to as an absolute domain name, is a domain name that specifies its exact location in the tree hierarchy of the Domain Name System (DNS). It specifies all domain levels, including the top-level domain and the root zone. An FQDN is distinguished by its lack of ambiguity in terms of DNS zone location in the hierarchy of DNS labels: it can be interpreted only in one way.

However, for the system 400 to work, each PGW 340, 350 needs two addresses. In one embodiment, the network configuration can be changed to allow the PGW to have two addresses such as:
topon.s5pgwdnsmfd2_1_.dnsmfd2_1_.aro.c1.node.epc.mnc260.mcc310.3gppnetwork.org
topon.s5pgwdnsmfd2_2_.dnsmfi2_2_.aro.c1.node.epc.mnc260.mcc310.3gppnetwork.org (emphasis added).

In the above two addresses, the third element and one of the address, namely "dnsmfd21.aro.c1.node.epc.mnc260.mcc310.3gppnetwork.org," refers to SGW 430 in the data cluster, and "s5pgwdnsmfd22.dnsmfi22.aro.c1.node.epc.mnc260.mcc310.3gppnetwork.org" refers to the SGW 330 in the voice cluster.

In another embodiment, the network configuration does not need to be changed, and the PGW 340, 350 has only one address, however, the SGW 330, 430 can have multiple addresses corresponding to the two PGWs with which the SGWs can communicate. Specifically, the two addresses can be:
topon.s11dnsmfd21.dnsmfd21.aro.c1.node.epc.mnc260.mcc310.3gppnetwork.org.
topon.s11dnsmfi21.dnsmfd21.aro.c1.node.epc.mnc260.mcc310.3gppnetwork.org.

In this embodiment, the SGW 330, 430 embeds the name of the PGW 340, 350. Specifically, the second element of the SGW "s11dnsmfd21", "s11dnsmfi21" (emphasis added), indicates that the SGW can communicate with the PGW 350 and PGW 340, respectively.

Figure 5:
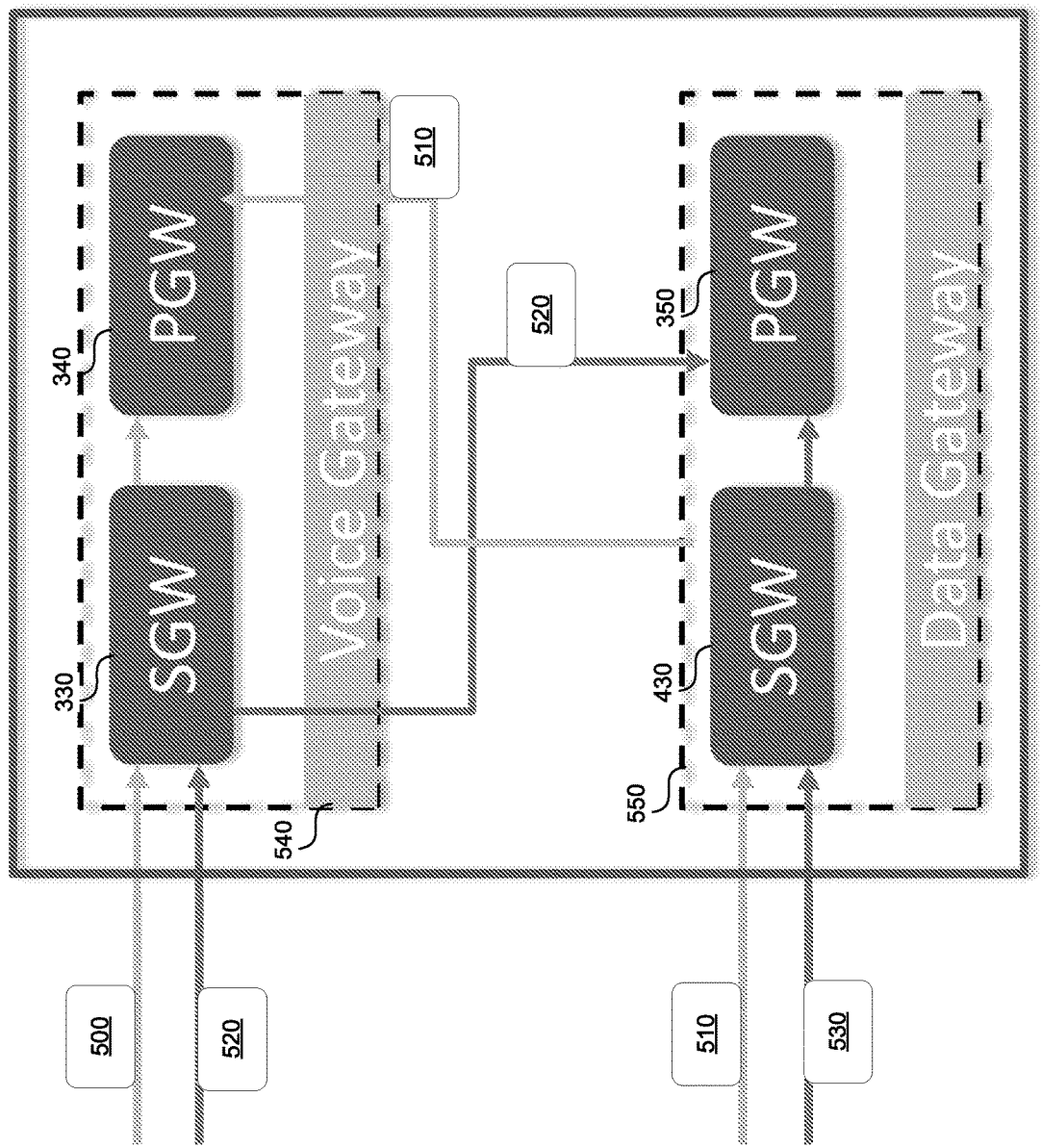
FIG. 5 shows the parallel handling of the voice and data packets by the new system.

FIG. 5 shows the parallel handling of the voice and data packets by the new system. The SGW 330 in the voice cluster 540 and the SGW 430 in the data cluster 550 can receive both voice packets 500, 510 and data packets 520, 530, respectively. The SGW 330 can determine which of the incoming packets are data packets and forward the data packets 520 to the PGW 350 in the data cluster 550. The SGW 330 can forward incoming voice packets 500 to the PGW 340 in the voice cluster 540. Similarly, the SGW 430 can forward the received voice packets 510 to the PGW 340 in the voice cluster 540, while forwarding the data packets 520 to the PGW 350 in the data cluster 550.

Figure 6:
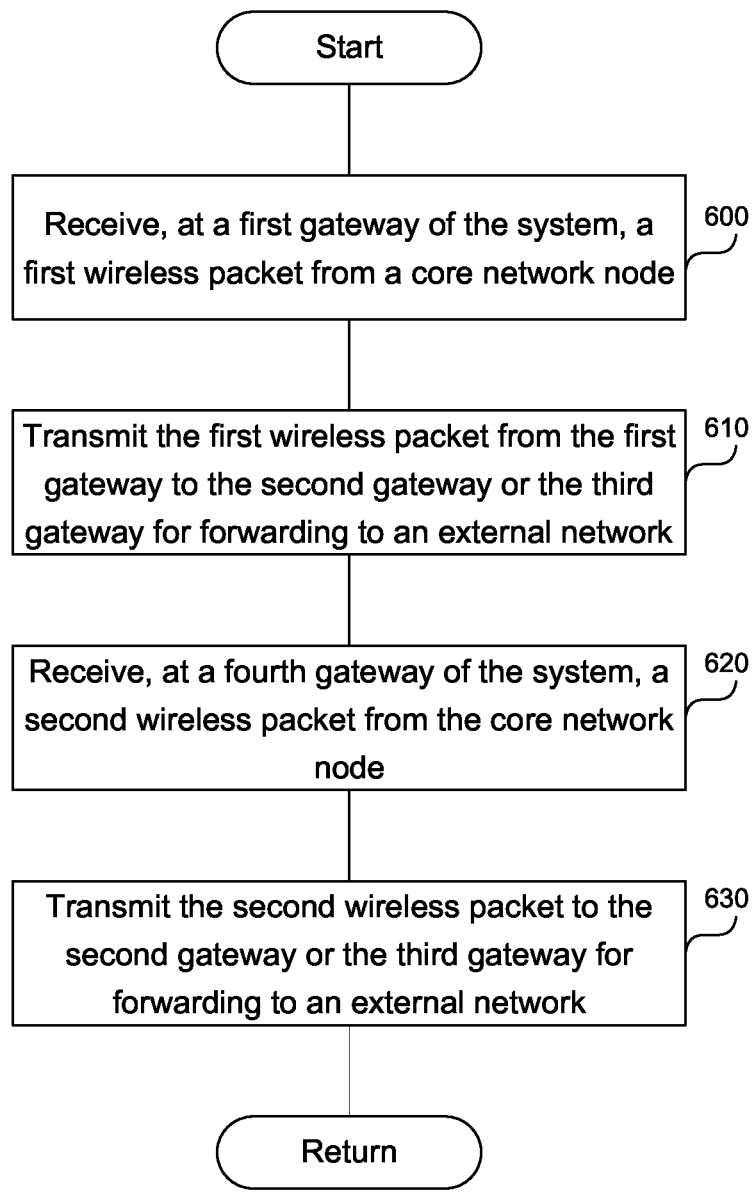
FIG. 6 is a flowchart of a method to increase capacity of a wireless telecommunication network.

FIG. 6 is a flowchart of a method to increase capacity of a wireless telecommunication network. A hardware or software processor executing instructions described in this application can, in step 600, receive, at a first gateway of the system, a first wireless packet from a core network node, where the first gateway is configured with a first internet address that includes an identifier of a second gateway of the system and with a second internet address that includes an identifier of a third gateway of the system.

In step 610, the processor can transmit the first wireless packet from the first gateway to the second gateway or the third gateway for forwarding to an external network, such as the internet. The first wireless packet is transmitted to the second gateway when the first wireless packet is a voice packet, however, the first wireless packet is transmitted to the third gateway when the first wireless packet is a data packet.

In step 620, the processor can receive, at a fourth gateway of the system, a second wireless packet from the core network node, where the fourth gateway is configured with a third internet address that includes the identifier of the second gateway and a fourth internet address that includes the identifier of a third gateway. The first gateway and the second gateway can be colocated, and the third gateway and the fourth gateway can be colocated. The first gateway and the second gateway can comprise a first SMF, and the third gateway and the fourth gateway can comprise a second SMF. The first gateway and the fourth gateway can be serving gateways (SGWs), while the second gateway and the third gateway are PGWs. The first gateway and the second gateway can comprise a voice cluster, while the third gateway and the fourth gateway can comprise a data cluster.

In step 630, the processor can transmit the second wireless packet to the second gateway or the third gateway for forwarding to an external network, such as the internet.

The second gateway can be configured with a fifth internet address that includes the identifier of the second gateway. The third gateway can be configured with a sixth internet address that includes the identifier of the third gateway. The first internet address, the second internet address, and the third internet address can be FQDNs.

Computer System

Figure 7:
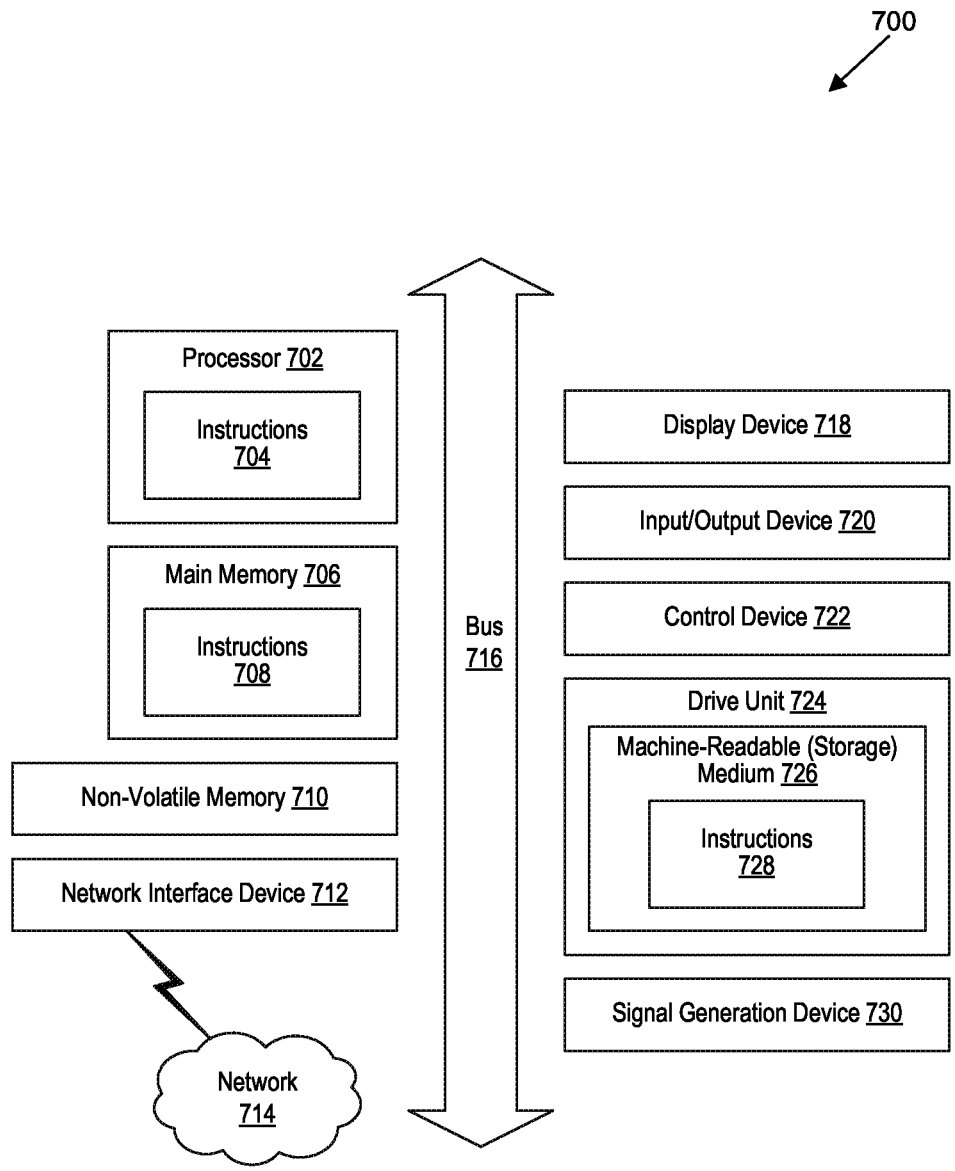
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the Figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems, or include one or more cloud components in one or more networks. Where appropriate, one or more computer systems 700 can perform operations in real time, near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed:

1. A telecommunications system comprising:
    a voice cluster including:
        a first serving gateway (SGW) configured to receive first voice packets and first data packets from a core network function, and
        a first packet data network gateway (PGW) colocated with the first SGW, the first PGW configured to receive the first voice packets from the first SWG and transmit the first voice packets to a network; and
    a data cluster including:
        a second SGW configured to receive second voice packets and second data packets from the core network function, and
        a second PGW colocated with the second SGW, the second PGW configured to receive the second data packets from the second SGW and transmit the second data packets to the network;
    wherein the first PGW is further configured to receive the second voice packets from the second SGW and transmit the second voice packets to the network, and
    wherein the second PGW is further configured to receive the first data packets from the first SGW and transmit the first data packets to the network.

2. The telecommunications system of claim 1, wherein the first SGW is configured with a first fully qualified domain name (FQDN) that includes:
    a first portion of the first FQDN that identifies the first SGW, and
    a second portion of the first FQDN that identifies the first PGW.

3. The telecommunications system of claim 2, wherein the first SGW is further configured with a second FQDN that includes:
    a first portion of the second FQDN that identifies the first SGW, and a second portion of the second FQDN that identifies the second PGW.

4. The telecommunications system of claim 2, wherein the first portion of the first FQDN further identifies an interface of the first SGW.

5. The telecommunications system of claim 1, wherein the first PGW is configured with only a single FQDN.

6. The telecommunications system of claim 5, wherein the single FQDN includes a portion identifying the first PGW.

7. The telecommunication system of claim 1, wherein the core network function is configured to transmit packets to the first SGW and the second SGW according to round-robin scheduling.

8. A telecommunications system comprising:
a first gateway of a first type configured to receive wireless packets from a core network node; and
a second gateway of a second type colocated with the first gateway and configured to transmit at least a portion of the wireless packets to a network,
wherein the first gateway is configured with a first internet address that identifies the second gateway and a second internet address that identifies a third gateway of the second type,
wherein the first gateway is configured to transmit a first portion of the wireless packets to the second gateway based on the first internet address and transmit a second portion of the wireless packets to the third gateway based on the second internet address, and
wherein the second gateway is configured with a third internet address that identifies the second gateway.

9. The telecommunications system of claim 8, wherein the first internet address further identifies the first gateway, and wherein the first gateway and the second gateway are identified in separate portions of the first internet address.

10. The telecommunications system of claim 8, wherein the first type is a serving gateway type and the second type is a packet data network (PDN) gateway type.

11. The telecommunications system of claim 8, wherein the first portion of the wireless packets comprise data packets.

12. The telecommunications system of claim 8, wherein the second gateway is configured to receive additional wireless packets from a fourth gateway of the first type that is colocated with the third gateway, and wherein the second gateway is configured to receive the additional wireless packets from the fourth gateway based on identifying that a fourth internet address associated with the fourth gateway identifies the second gateway.

13. The telecommunications system of claim 8, wherein the first gateway and the second gateway comprise a voice cluster, and wherein the third gateway comprises a data cluster.

14. The telecommunications system of claim 8, wherein the first internet address, the second internet address, and the third internet address are fully qualified domain names (FQDNs).

15. A non-transitory, computer-readable storage medium storing instructions, which, when executed by at least one data processor of a system, cause the system to:
receive, at a first gateway of the system, a first wireless packet from a core network node,
wherein the first gateway is configured with a first internet address that includes an identifier of a second gateway of the system and with a second internet address that includes an identifier of a third gateway of the system;
transmit the first wireless packet from the first gateway to the second gateway or the third gateway for forwarding to an external network;
receive, at a fourth gateway of the system, a second wireless packet from the core network node,
wherein the fourth gateway is configured with a third internet address that includes the identifier of the second gateway and a fourth internet address that includes the identifier of a third gateway; and
transmit the second wireless packet to the second gateway or the third gateway for forwarding to an external network.

16. The non-transitory, computer-readable storage medium of claim 15, wherein the first gateway and the second gateway are colocated, and wherein the third gateway and the fourth gateway are colocated.

17. The non-transitory, computer-readable storage medium of claim 16, wherein the first gateway and the second gateway comprise a first session management function (SMF), and wherein the third gateway and the fourth gateway comprise a second SMF.

18. The non-transitory, computer-readable storage medium of claim 15, wherein the first wireless packet is transmitted to the second gateway when the first wireless packet is a voice packet; and wherein the first wireless packet is transmitted to the third gateway when the first wireless packet is a data packet.

19. The non-transitory, computer-readable storage medium of claim 15, wherein the first gateway and the fourth gateway are serving gateways (SGWs), wherein the second gateway and the third gateway are packet data network gateways (PGWs).

20. The non-transitory, computer-readable storage medium of claim 15, wherein the second gateway is configured with a fifth internet address that includes the identifier of the second gateway, and wherein the third gateway is configured with a sixth internet address that includes the identifier of the third gateway.

* * * * *